United States Patent
Lee

(10) Patent No.: US 10,296,139 B2
(45) Date of Patent: May 21, 2019

(54) REFRESHING METHOD OF SENSING BASELINE VALUES FOR CAPACITIVE SENSOR DEVICE AND CAPACITIVE SENSOR DEVICE

(71) Applicants: SALT INTERNATIONAL CORP., New Taipei (TW); IMAGINATION BROADWAY LTD., New Taipei (TW)

(72) Inventor: Shang-Li Lee, New Taipei (TW)

(73) Assignees: SALT INTERNATIONAL CORP., New Taipei (TW); IMAGINATION BROADWAY LTD., New Taipei (TW)

( * ) Notice: Subject to any disclaimer, the term of this patent is extended or adjusted under 35 U.S.C. 154(b) by 350 days.

(21) Appl. No.: 15/412,776

(22) Filed: Jan. 23, 2017

(65) Prior Publication Data
US 2017/0242540 A1 Aug. 24, 2017

(30) Foreign Application Priority Data
Feb. 22, 2016 (TW) .............................. 105105188 A

(51) Int. Cl.
*G06F 3/044* (2006.01)
*G06F 3/041* (2006.01)

(52) U.S. Cl.
CPC ............ *G06F 3/0418* (2013.01); *G06F 3/044* (2013.01)

(58) Field of Classification Search
CPC .................. G06F 3/044; G06F 3/0418; G06F 2203/04103; G06F 2203/04111; G06F 2003/04112
See application file for complete search history.

*Primary Examiner* — William Boddie
*Assistant Examiner* — Jeffrey Parker
(74) *Attorney, Agent, or Firm* — Andrew M. Calderon; Roberts Mlotkowski Safran Cole & Calderon, P.C.

(57) ABSTRACT

A refreshing method of sensing baseline values for a capacitive sensor device and the capacitive sensor device are applied to confirm whether the differences between the current measured values and the factory or record baseline values are approximately equal, to determine whether to use current measured values as the sensing baseline values used in the following sensing procedure. When the differences are approximately equal, the current measured values are used as the sensing baseline values. When the differences are not approximately equal, the factory baseline values are used as the sensing baseline values, and the correcting procedure of the sensing baseline values of the sensing points is executed. In the correcting procedure, the signal characteristic of the measured value of each sensing point is detected to be high frequency or low frequency, to determine whether to refresh the corresponding sensing baseline values by the current measured values.

14 Claims, 12 Drawing Sheets

REFRESHING METHOD OF SENSING BASELINE VALUES FOR CAPACITIVE SENSOR DEVICE AND CAPACITIVE SENSOR DEVICE

CROSS-REFERENCE TO RELATED APPLICATION

This non-provisional application claims priority under 35 U.S.C. § 119(a) to Patent Application No. 105105188 filed in Taiwan, R.O.C. on Feb. 22, 2016, the entire contents of which are hereby incorporated by reference.

BACKGROUND

Technical Field

The instant disclosure relates to a capacitive touch control technique and, more particularly, to a refreshing method of sensing baseline values for a capacitive sensor device and the capacitive sensor device.

Related Art

To meet the convenience of use, more and more electronic devices adopt touch screens as controlling interfaces. Users can directly touch an image on a touch screen to control. Touch control is more convenient and more user-friendly. A touch screen includes a display for displaying and a sensor device for touch control.

Generally, the sensor device utilizes a self-capacitance sensing technique and/or a mutual capacitance sensing technique to sense if a touch is made by a user. When the sensor device senses that a capacitance at a certain coordinate position varies in a sensing procedure, the sensor device determines that the certain coordinate position is touched by a user. During operation, an untouched capacitance (a sensing baseline value) at each of coordinate positions is saved in the sensor device in advance, and then, when new capacitances (sensing values) are received, the received sensing values are compared with corresponding sensing baseline values by the sensor device to determine whether a certain coordinate position is touched.

Nevertheless, long-staying objects (water, hand, heat from fingers/hands or conductive objects stayed on the sensor device for a long time) may cause the sensor device to misjudge. During operation, the sensor device may regularly refresh the sensing baseline values. If a conductive object has contacted the sensor device for long time before the sensing baseline values are refreshed, the refreshed sensing baseline values may include capacitances caused by the long-staying object such that the refreshed baseline values are wrong bases for calculating captured signals later. If the sensor device does not refresh immediately the sensing baseline values when the long-staying objects are removed from the sensor device, a false touch is caused by the heat remained on the sensor device by the just-removed object, so that the sensor device misjudges the a false touch to be a touch event.

SUMMARY

With the foregoing in mind, many people in the art study how to effectively prevent sensor devices from misjudging caused by the long-staying objects, to improve the capability of self-capacitance sensor device.

In an embodiment, a refreshing method of sensing baseline values for a capacitive sensor device comprises: reading a plurality of factory baseline values of a plurality of sensing points; reading a plurality of record baseline values of the sensing points; sensing the sensing points to obtain a plurality of first measured values of the sensing points; calculating a plurality of first differences between the first measured values and the corresponding factory baseline values of the sensing points; calculating a first variance of the first differences; comparing the first variance with a first threshold; when the first variance is less than the first threshold, using the first measured values as the sensing baseline values of the sensing points and executing a sensing procedure of the position information of the sensing points based upon the sensing baseline values; calculating a plurality of second differences between the first measured values and the corresponding record baseline values of the sensing points; calculating a second variance of the second differences; comparing the second variance with a second threshold; when the second variance is less than the second threshold, using the first measured values as the sensing baseline values of the sensing points and executing the sensing procedure based upon the sensing baseline values; when the first variance is not less than the first threshold and the second variance is not less than the second threshold, using the factory baseline values as the sensing baseline values of the sensing points, disabling the driving of the sensing points, and executing a correcting procedure of each of the sensing points; and after the correcting procedures of all of the sensing points are complete, executing the sensing procedure based upon the sensing baseline values.

Wherein, the correcting procedure of each of the sensing points comprises: repeatedly sensing the sensing point several times to obtain a plurality of second measured values of the sensing point; executing a multistage filtering of the second measured values in sequence to generate a filtering series; determining whether the signal characteristic of each of the second measured values is high frequency or low frequency in sequence based upon the filtering series and a variation threshold; counting a continuous number of times that the signal characteristics of the second measured values are continuously determined to be low frequency in the situation that the driving of the sensing points is disabled; when the signal characteristics of the second measured values are the first time to be determined to be high frequency, enabling the driving of plural sensing points of all of the sensing points; counting an accumulated times that the rest of the signal characteristics of the second measured values are determined to be high frequency in the situation that the driving of the sensing points is enabled; when the continuous number reaches a third threshold, sensing the sensing point again to obtain a third measured value of the sensing point and refreshing the sensing baseline value of the sensing point by the third measured value; and when the accumulated times reaches a fourth threshold, sensing the sensing point again to obtain a fourth measured value of the sensing point and refreshing the sensing baseline value of the sensing point by the fourth measured value.

In an embodiment, a capacitive sensor device comprises: a plurality of first electrode lines, a plurality of second electrode lines, a storing unit, and a sensing controller. The first electrode lines and the second electrode lines are arranged in a staggered manner and define a plurality of sensing points arranged in a matrix. The storing unit is for storing a plurality of factory baseline values and a plurality of record baseline values of the sensing points. The sensing controller is electrically connected to the first electrode lines, the second electrode lines, and the storing unit. The sensing controller is for executing the aforementioned refreshing procedure.

Concisely, according to the embodiments of the refreshing method of sensing baseline values for a capacitive sensor device and the capacitive sensor device, the misjudgment occurring due to the touching element touching the sensor device for a long time can be avoided, and the error of measured values caused by immediately determining the sensing baseline values when the touch event occurs or ends can also be avoid. Therefore, the sensing baseline values to a usable state are rapidly transferred, the times of refreshing the sensing baseline values can be decreased, and resources can be saved.

DETAILED DESCRIPTION

Figure 1:
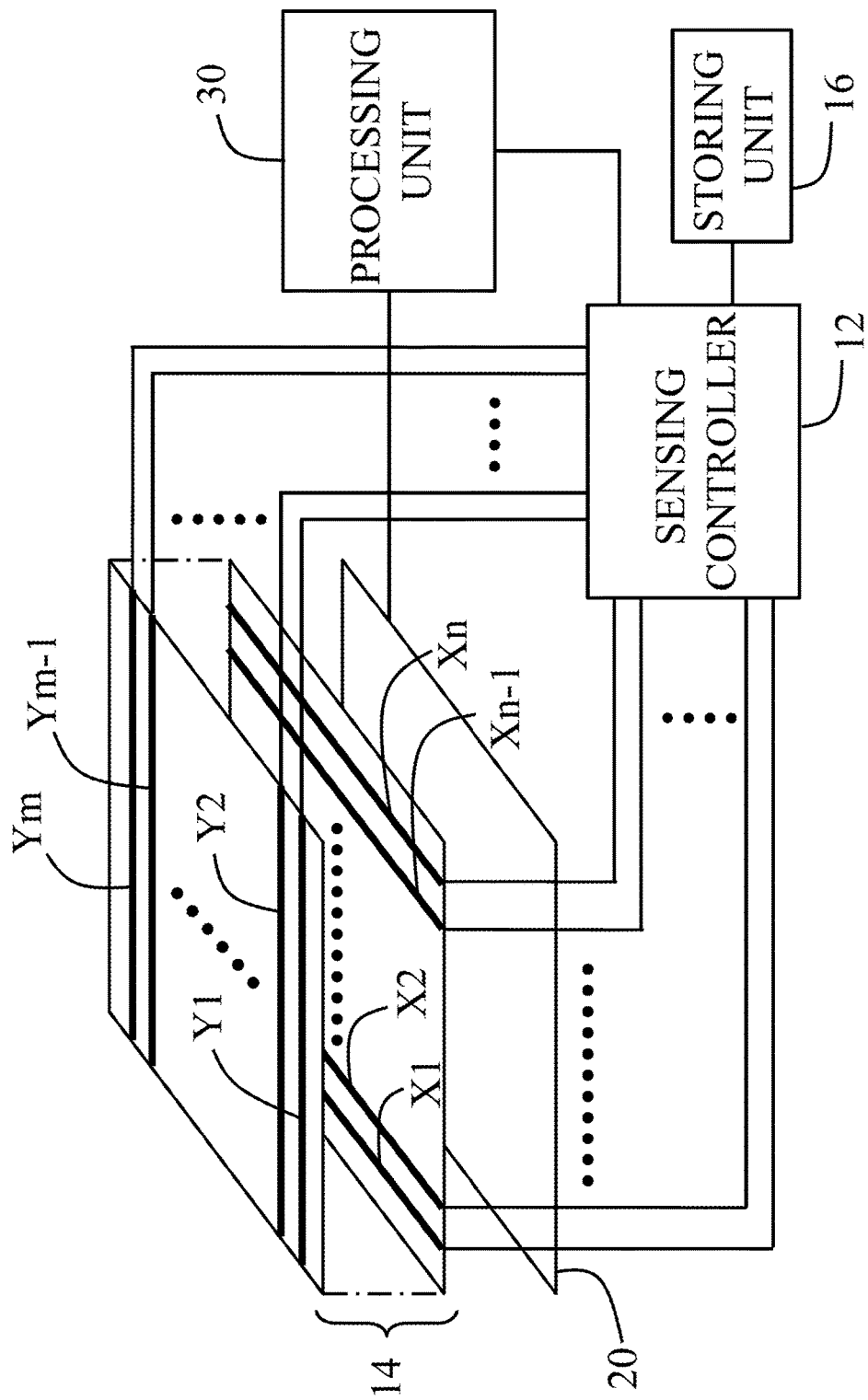
FIG. 1 illustrates a block diagram of an electronic device of a sensor device according to an embodiment of the instant disclosure.
Figure 2:
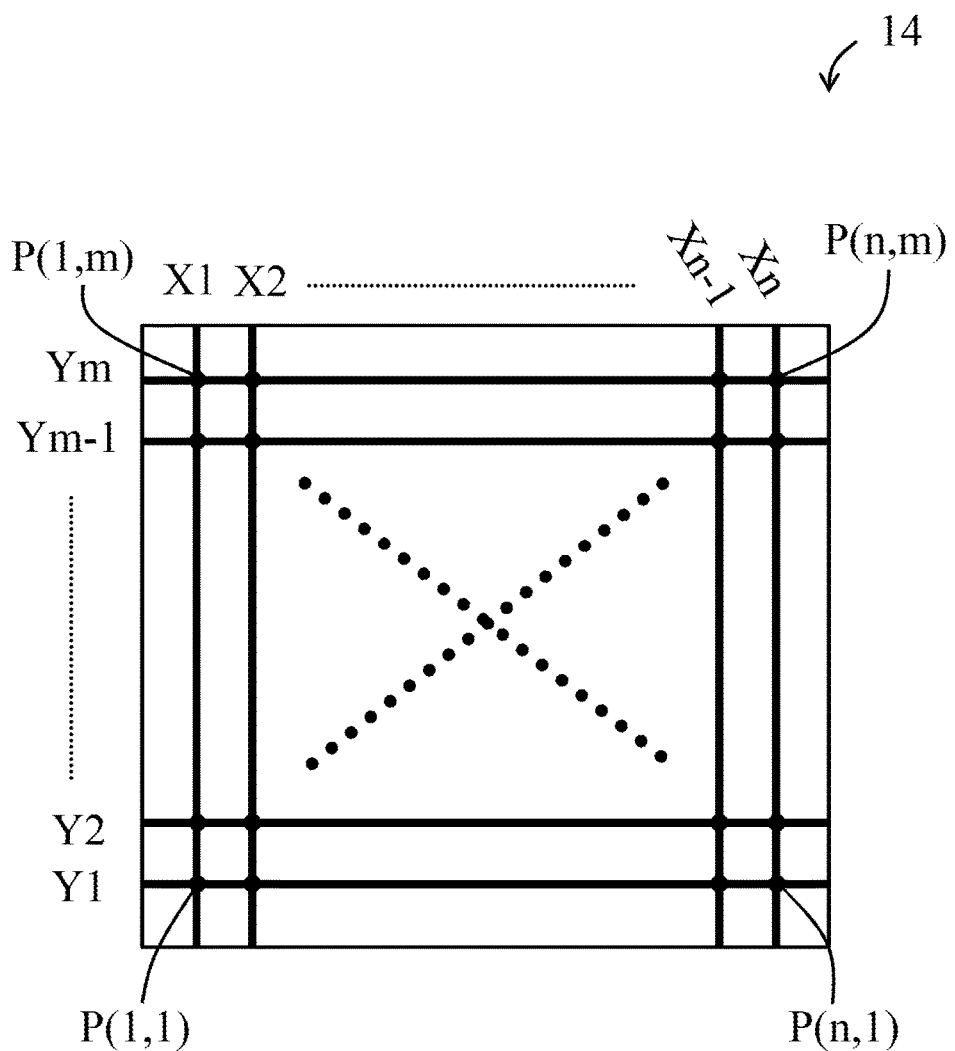
FIG. 2 illustrates a diagram of a signal sensor of FIG. 1 according to an embodiment of the instant disclosure.

FIG. 1 is a block diagram of an electronic device of a sensor device according to an embodiment of the instant disclosure. FIG. 2 is a diagram of a signal sensor of FIG. 1 according to an embodiment of the instant disclosure. Although the following illustration is an example of an electronic device, the instant disclosure is not limited to the example.

Referring to FIG. 1, the electronic device comprises a capacitive sensor device, a display 20, and a processing unit 30. The capacitive sensor device comprises a sensing controller 12, a signal sensor 14, and a storing unit 16. The sensing controller 12 is connected to the signal sensor 14 and the storing unit 16. The signal sensor 13 is disposed on a displaying surface of the display 20. The processing unit 30 is electrically connected to the sensing controller 12 and the display 20.

The signal sensor 14 comprises a plurality of electrode lines arranged in a staggered manner. The electrode lines are electrically connected to the sensing controller 12. Wherein, n and m are positive integers and, moreover, n can be equal to m or not equal to m.

In a top view, the electrode lines comprise first electrode lines X1-Xn spaced from one another and second electrode lines Y1-Ym spaced from one another. The first electrode lines X1-Xn and the second electrode lines Y1-Ym are arranged in a staggered manner, respectively, and define a plurality of sensing points P(1, 1)–P(n, m) arranged in a matrix (a sensing region is formed consequently), as shown in FIG. 2. In other words, the first electrode lines X1-Xn and the second electrode lines Y1-Ym form a plane coordinate system. In some embodiments, the plane coordinate system can be Cartesian coordinate system, a polar coordinate system, a non-Cartesian coordinate system, or other plane coordinate systems.

Moreover, the first electrode lines X1-Xn and the second electrode lines Y1-Ym arranged in a staggered manner form a diamond-hive shape, a mesh shape, or a grille shape in a top view. The first electrode lines X1-Xn and the second electrode lines Y1-Ym can be one or more layers of patterned conductive thin film. In some embodiments (such as an application of a touch screen with a display 20), each of the layers of the patterned conductive thin film can be a transparent material or a semitransparent material, e.g., an indium tin oxide (ITO) thin film. In some other embodiments (such as an application of an electronic drawing board or an electronic hand writing board without any displays 20), each of the layers of the patterned conductive thin film can be a non-transparent material.

In the embodiments, techniques of a self-capacitance touch control, a mutual capacitance touch control, or a positive-negative reading touch control can be adopted by the sensing controller 12 to sense touch movements of a user.

Executing procedures of the sensing controller 12 comprises a refreshing procedure of sensing baseline values of the sensing points P(1, 1)–P(n, m), a sensing procedure of position information of the sensing points P(1, 1)–P(n, m), and a correcting procedure of the sensing points P(1, 1)–P(n, m).

Figure 3:
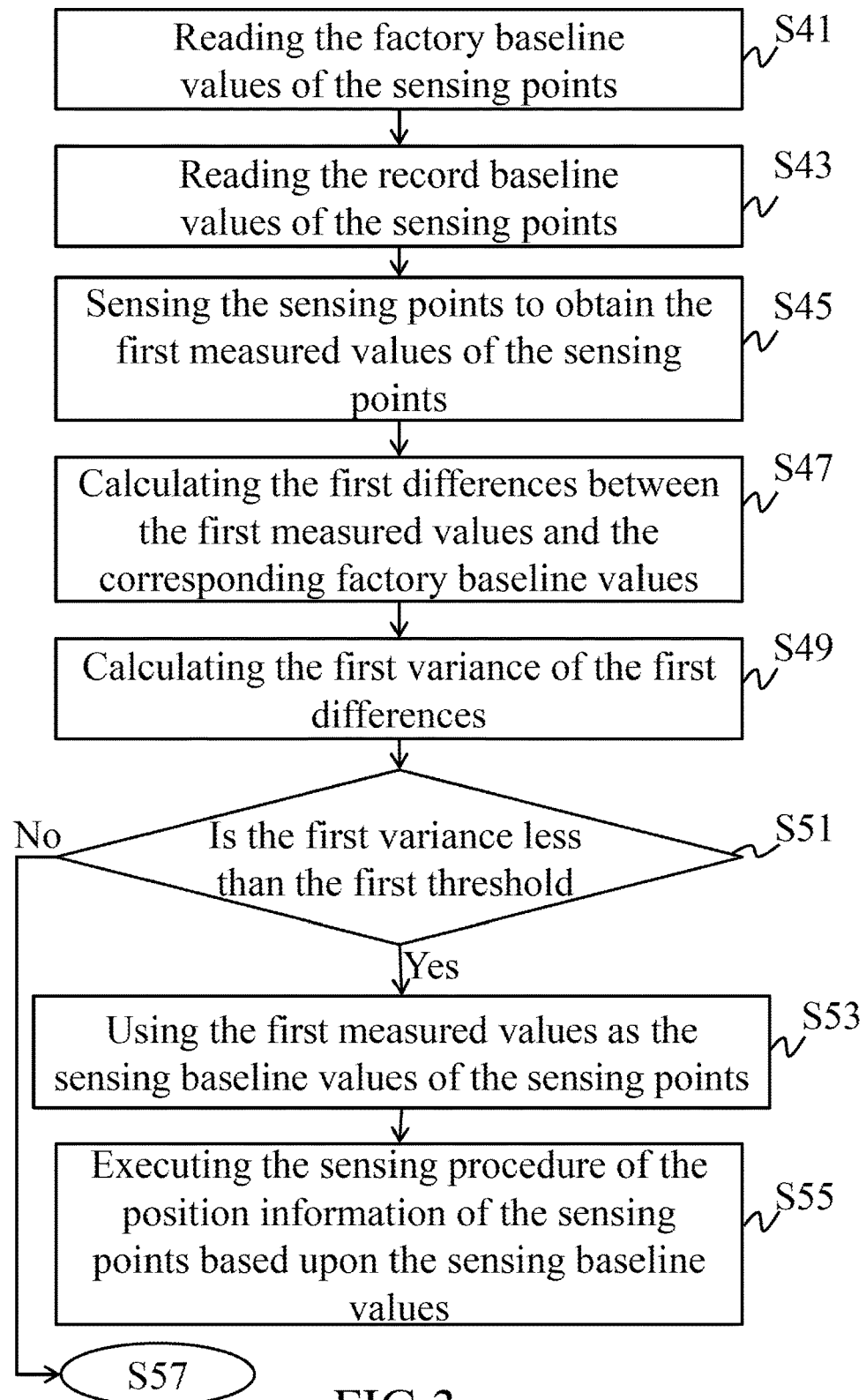
FIGS. 3 and 4 illustrate flow charts of a refreshing method of sensing baseline values for a capacitive sensor device according to an embodiment of the instant disclosure.
Figure 4:
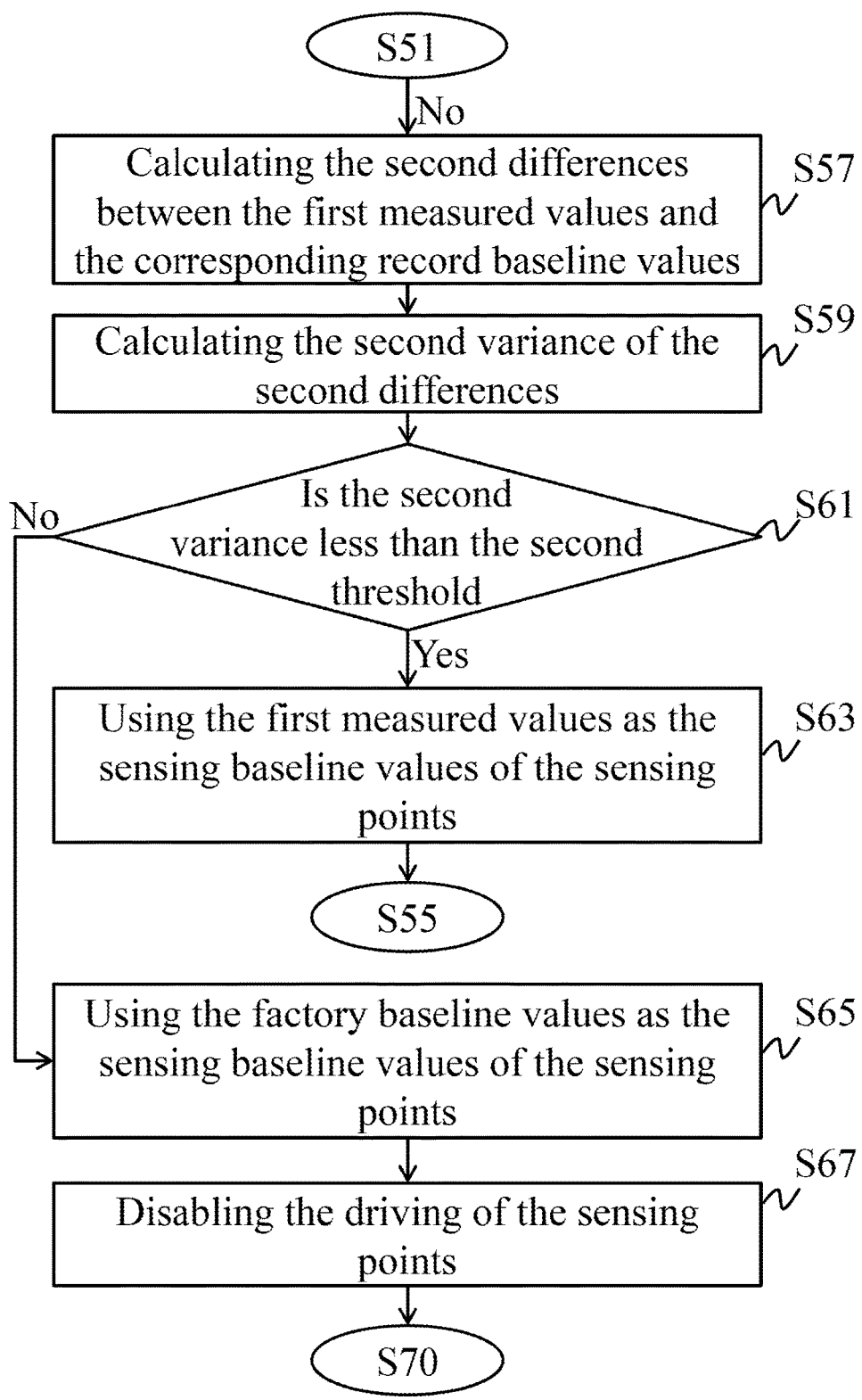

FIGS. 3 and 4 are flow charts of a refreshing method of the sensing baseline values for the capacitive sensor device according to an embodiment of the instant disclosure.

In a starting process, the sensing controller 12 receives a turn-on signal. The sensing controller 12 executes the refreshing procedure of the sensing baseline values of the sensing points P(1, 1)–P(n, m) according to the turn-on signal.

In the refreshing procedure, referring to FIG. 3, the sensing controller 12 reads factory baseline values of the sensing points P(1, 1)–P(n, m) from the storing unit 16 (step S41) and reads record baseline values of the sensing points P(1, 1)–P(n, m) from the storing unit 16 (step S43).

Further, the sensing controller 12 senses all of the sensing points P(1, 1)–P(n, m) to obtain measured values (hereinafter called the first measured values) of the sensing points P(1, 1)–P(n, m) (step S45).

After the first measured values of the sensing points P(1, 1)–P(n, m) are obtained (step S45), the sensing controller 12 calculates differences (hereinafter called the first differences) between each of the first measured values and each of the individually corresponding factory baseline values (step S47). In other words, the sensing controller 12 calculates the first difference between the first measured value of the sensing point P(1, 1) and the factory baseline value of the sensing point P(1, 1), the first difference between the first measured value of the sensing point P(2, 1) and the factory baseline value of the sensing point P(2, 1), . . . and, analogously, the first difference between the first measured value of the sensing point P(n, m) and the factory baseline value of the sensing point P(n, m).

After the first differences between all of the first measured values of the sensing points P(1, 1)–P(n, m) and all of the individually corresponding factory baseline values are calculated, the sensing controller 12 calculates the mean value and a variance (hereinafter called the first variance) of all of the first differences (step S49).

After the first variance is calculated (step S49), the sensing controller 12 compares the first variance with a first threshold (step S51) to confirm whether differences between the first measured values and the factory baseline values are approximately equal (i.e., a current surface state of the sensing region of the signal sensor 14 is similar to a factory surface state). In some embodiments, the factory baseline values and the first threshold can be default values previously stored in the storing unit 16. In some embodiments, the factory baseline values and the first threshold can be obtained by measuring and calculating, in the same sensing technique, a number of capacitive sensor devices (e.g., ten, twenty, thirty, or more) with the same specification (e.g., the same size and the same thickness of glasses) manufactured in the same time (the same batch).

When the first variance is less than the first threshold (i.e., the differences between the first measured values and the factory baseline values are approximately equal), the sensing controller 12 uses the first measured values of the sensing points P(1, 1)–P(n, m) as the sensing baseline values of the sensing points P(1, 1)–P(n, m) (step S53) and executes the sensing procedure of the position information of the sensing points P(1, 1)–P(n, m) based upon current sensing baseline values (the sensing baseline values of the sensing points P(1, 1)–P(n, m) established in step S53) (step S55).

After the first measured values of the sensing points P(1, 1)–P(n, m) are obtained (step S45), the sensing controller 12 further calculates differences (hereinafter called the second differences) between each of the first measured values and each of the corresponding record baseline values (step S57). In other words, the sensing controller 12 calculates the second difference between the first measured value of the sensing point P(1, 1) and the record baseline value of the sensing point P(1, 1), the second difference between the first measured value of the sensing point P(2, 1) and the record baseline value of the sensing point P(2, 1), . . . and, analogously, the second difference between the first measured value of the sensing point P(n, m) and the record baseline value of the sensing point P(n, m).

After the second differences between all of the first measured values of the sensing points P(1, 1)–P(n, m) and all of the individually corresponding record baseline values are calculated, the sensing controller 12 calculates the mean value and a variance (hereinafter called the second variance) of all of the second differences (step S59).

After the second variance is calculated (step S59), the sensing controller 12 compares the second variance with a second threshold (step S61) to confirm whether differences between the first measured values and the record baseline values are approximately equal (i.e., a current surface state of the sensing region of the signal sensor 14 is similar to a surface state recorded previously when the signal sensor 14 is turned off). In some embodiments, the second threshold can be another default value previously stored in the storing unit 16. In some embodiments, the second threshold can be obtained by measuring and calculating, in the same sensing technique, a number of capacitive sensor devices (e.g., ten, twenty, thirty, or more) with the same specification (e.g., the same size and the same thickness of glasses) manufactured in the same time (the same batch).

When the second variance is less than the second threshold, the sensing controller 12 uses the first measured values of the sensing points P(1, 1)–P(n, m) as the sensing baseline values of the sensing points P(1, 1)–P(n, m) (step S63) and executes the sensing procedure of the position information of the sensing points P(1, 1)–P(n, m) based upon current sensing baseline values (the sensing baseline values of the sensing points P(1, 1)–P(n, m) established in step S63) (step S55).

However, when the first variance is not less than the first threshold and the second variance is not less than the second threshold (i.e., the differences between the first measured values and the factory baseline values and the differences between the first measured values and the record baseline values are not approximately equal, which means that when the signal sensor 14 is turned on, there has already been a different touching element on the sensing region or there has already been a factor such as new partial noises affecting sensing results on the signal sensor 14), the sensing controller 12 uses the factory baseline values of all of the sensing points P(1, 1)–P(n, m) as the sensing baseline values of the sensing points P(1, 1)–P(n, m) (step S65) and disable the driving of the sensing points P(1, 1)–P(n, m) (step S67). In other words, the sensing controller 12 does not drive the sensing points P(1, 1)–P(n, m), i.e., the sensing procedure of the position information of the sensing points P(1, 1)–P(n, m) is not executed. In an embodiment of step S67, the sensing controller 12 does not provide a driving voltage to the sensing points P(1, 1)–P(n, m). In another embodiment of step S67, the sensing controller 12 has the sensing points P(1, 1)–P(n, m) connected to ground.

After disabling the driving of the sensing points P(1, 1)–P(n, m) (step S67), the sensing controller 12 executes a correcting procedure of the sensing points P(1, 1)–P(n, m) (step S70).

Figure 5:
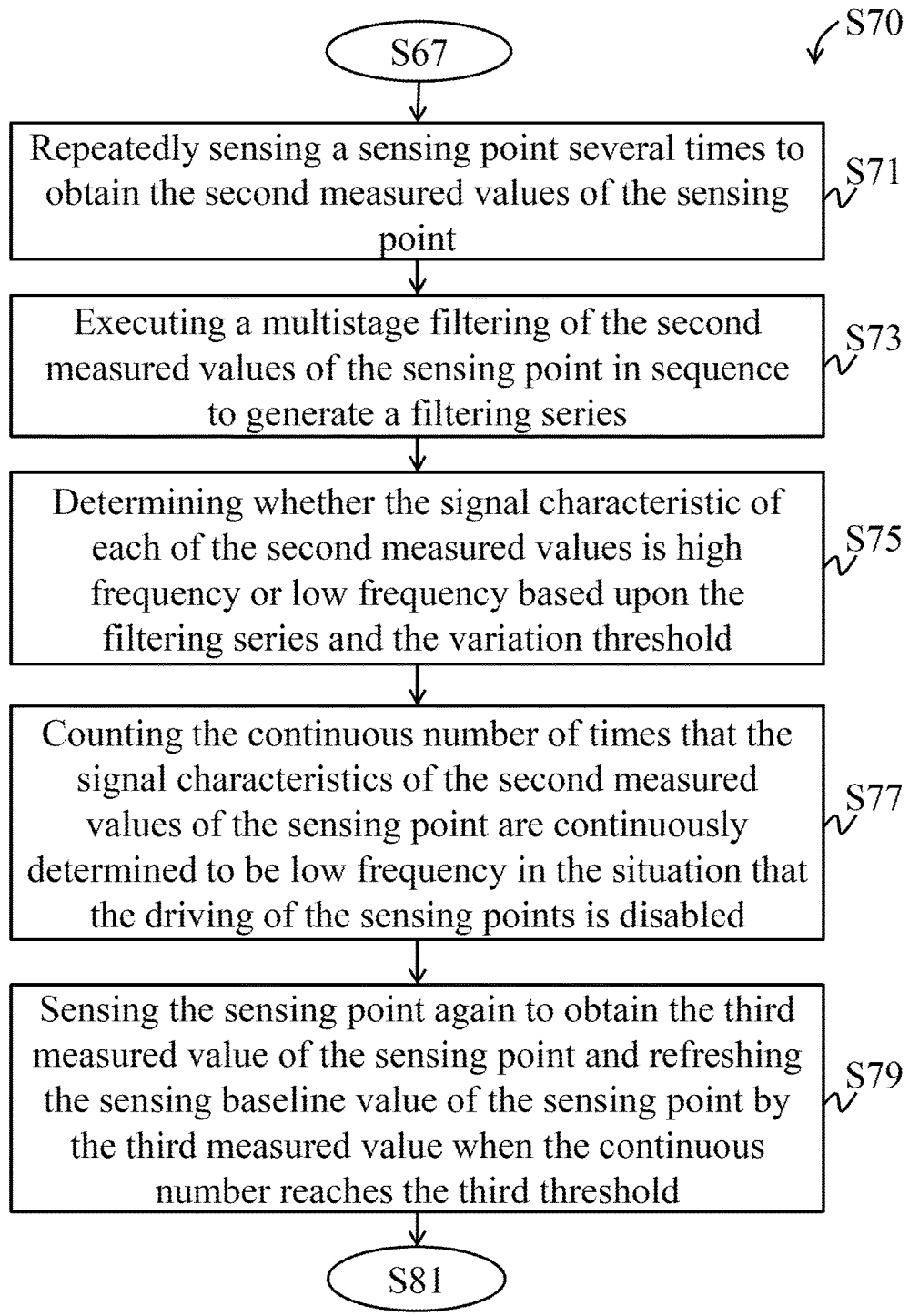
FIGS. 5 and 6 illustrate detailed flow charts of step S70 of FIG. 4 according to an embodiment of the instant disclosure.
Figure 6:
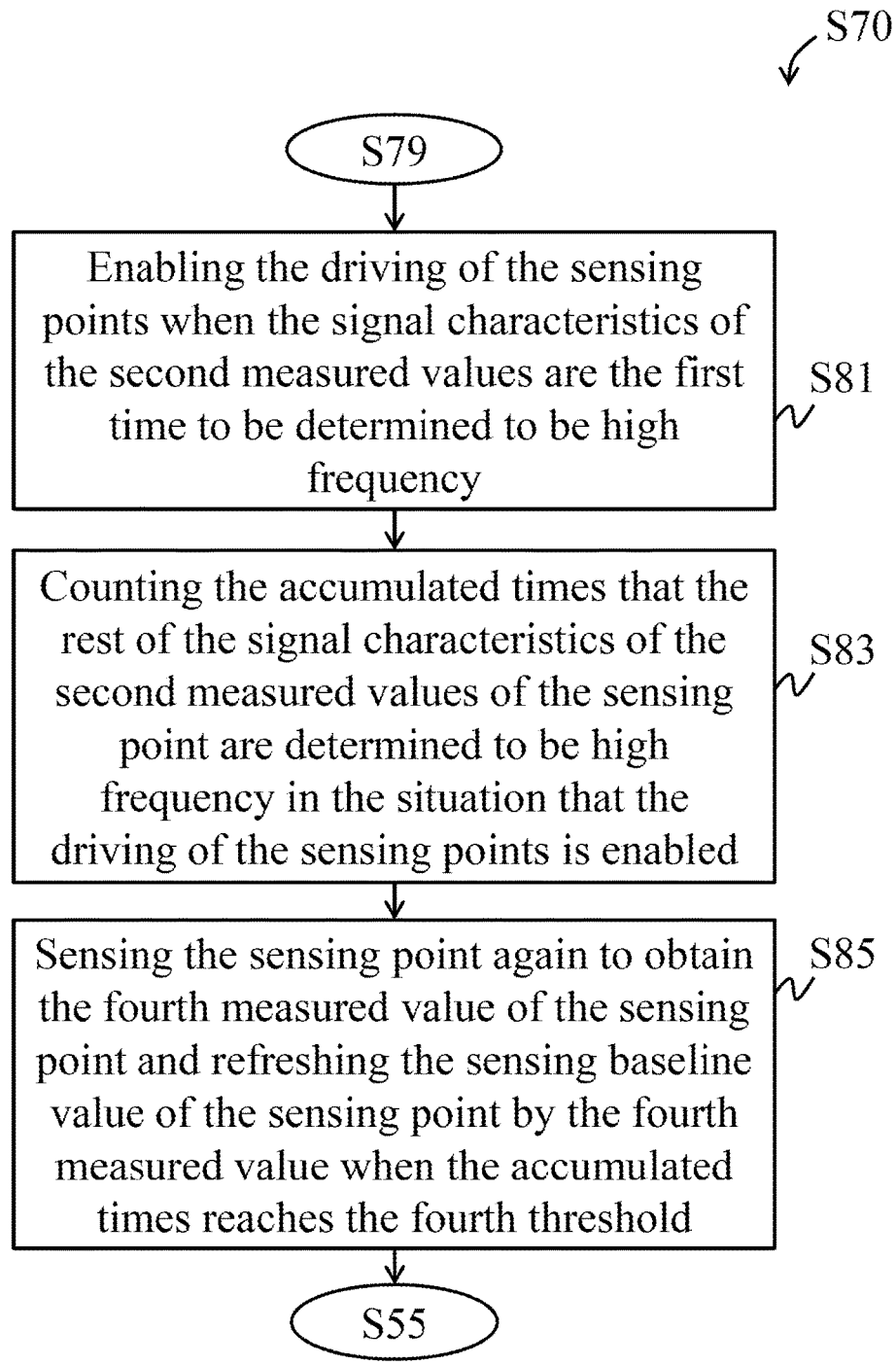

FIGS. 5 and 6 are detailed flow charts of step S70 of FIG. 4 according to an embodiment of the instant disclosure.

Below is an example of the correcting procedure of the sensing point P(1, 1). In the correcting procedure, referring to FIG. 5, the sensing controller 12 repeatedly senses the sensing point P(1, 1) several times (continuously senses the sensing point P(1, 1)) to obtain a plurality of measured values (hereinafter called the second measured values) of the sensing point P(1, 1) (step S71).

After repeatedly sensing the sensing point P(1, 1) several times (step S71), the sensing controller 12 executes a multistage filtering of the second measured values of the sensing point P(1, 1) in sequence to generate a filtering series (step S73).

In some embodiments, the multistage filtering can be practiced by the calculation of convolution (equation (1) listed below).

$$y[t] = \sum_{i=1}^{k} b[i] \times x[t-i] \qquad (1)$$

Wherein, y[t] is a value of convolution of the sensing point P(1, 1), t is a sequence of sensing, k is an order of filtering, x[t−i] is the second measured value of the sensing point P(1, 1), and b[i] is a function of the multistage filtering. In the embodiment, the function of the multistage filtering can be a high pass filtering (HPF) topology or a low pass filtering (LPF) topology. In other words, the multistage filtering can be a high pass filtering or a low pass filtering.

Below is an example of a high pass filtering function of ten orders. Values of the filtering function of each order are listed below: b1=−0.025120904, b2=−0.050093264, b3=−0.094839125, b4=−0.191258273, b5=−0.629379518, b6=0.629379518, b7=0.191258273, b8=0.094839125, b9=0.050093264 and b10=0.025120904.

In addition, below is an example that the number of sensing times is 18 (step S71), the order of high pass filtering is 4, and the touching element is hand. The generated filtering series is shown in table 1.

TABLE 1

| Sequence of sensing | x[t-i] | y[t] |
|---|---|---|
| 1 | 0 | 0 |
| 2 | 0 | 0 |
| 3 | 6 | 0 |
| 4 | 0 | 0 |
| 5 | 0 | 0 |
| 6 | 50 | −8.33 |
| 7 | 50 | −39.35 |
| 8 | 50 | −8.33 |
| 9 | 50 | 3.55 |
| 10 | 10 | 6.67 |
| 11 | 10 | 31.5 |
| 12 | 10 | 6.67 |
| 13 | 10 | 0 |
| 14 | 10 | 0 |
| 15 | 10 | 0 |
| 16 | 10 | 0 |
| 17 | 10 | 0 |
| 18 | 10 | 0 |

After generating the filtering series of the sensing point P(1, 1) (step S73), the sensing controller 12 determines whether a signal characteristic of each of the second measured values is high frequency or low frequency in sequence based upon the filtering series and a variation threshold (step S75).

In the embodiment, the sensing controller 12 counts a number (hereinafter called the continuous number) of times that the signal characteristics of the second measured values of the sensing point P(1, 1) are continuously determined to be low frequency in the situation that the driving of the sensing points P(1, 1)–P(n, m) is disabled (step S77).

After counting the continuous number (step S77), the sensing controller 12 confirms whether the continuous number reaches a third threshold. When the continuous number reaches the third threshold, the sensing controller 12 senses the sensing point P(1, 1) again to obtain a measured value (hereinafter called the third measured value) of the sensing point P(1, 1) and refreshes (updates) the sensing baseline value of the sensing point P(1, 1) by the third measured value of the sensing point P(1, 1) (step S79) which is obtained once again. In some embodiments, the third threshold can be a default value previously stored in the storing unit 16. In some embodiments, the third threshold is a positive integer. In some embodiments, the third threshold is greater than 1 and is less than the times of repeatedly sensing the sensing point P(1, 1) of step S71.

Referring to FIG. 6, when the signal characteristics of the second measured values of the sensing point P(1, 1) are the first time to be determined to be high frequency, the sensing controller 12 enables the driving of the sensing points P(1, 1)–P(n, m) (step S81). In this embodiment, all of the sensing points P(1, 1)–P(n, m) are, but not limited to, driven. Alternatively, the sensing points P(1, 1)–P(a, b) with respect to a certain sensing region (e.g., a region of a*b) including the determined sensing point P(1, 1) are driven. Wherein, "a" is a positive integer which is less than n and greater than 1, and "b" is a positive integer which is less than m and greater than 1. For illustration purpose, below is an example that all of the sensing points P(1, 1)–P(n, m) are driven.

After the sensing points P(1, 1)–P(n, m) are driven since the signal characteristics of the second measured values of the sensing point P(1, 1) are the first time to be determined to be high frequency (step S81), the sensing controller 12 counts times (hereinafter called the accumulated times) that the rest of the signal characteristics of the second measured values of the sensing point P(1, 1) are determined to be high frequency in the situation that the driving of the sensing points P(1, 1)–P(n, m) is enabled (step S83).

After counting the accumulated times, the sensing controller 12 confirms whether the accumulated times reaches a fourth threshold. When the accumulated times reaches the fourth threshold, the sensing controller 12 senses the sensing point P(1, 1) again to obtain a measured value (hereinafter called the fourth measured value) of the sensing point P(1, 1) and refreshes (updates) the sensing baseline value of the sensing point P(1, 1) by the fourth measured value of the sensing point P(1, 1) (step S85) which is obtained once again. In some embodiments, the fourth threshold can be a default value previously stored in the storing unit 16. In some embodiments, the fourth threshold is a positive integer. In some embodiments, the fourth threshold is greater than 1 and is less than the times of repeatedly sensing the sensing point P(1, 1) of step S71.

After the correcting procedures of all of the sensing points P(1, 1)–P(n, m) are complete (step S70), the sensing controller 12 executes the sensing procedure of the position information of the sensing points P(1, 1)–P(n, m) based upon current sensing baseline values (the sensing baseline values of the sensing points P(1, 1)–P(n, m) corrected and obtained in step S70) (step S55).

FIGS. 7-10 are detailed flow charts of step S70 of FIG. 4 according to another embodiment of the instant disclosure.

Figure 7:
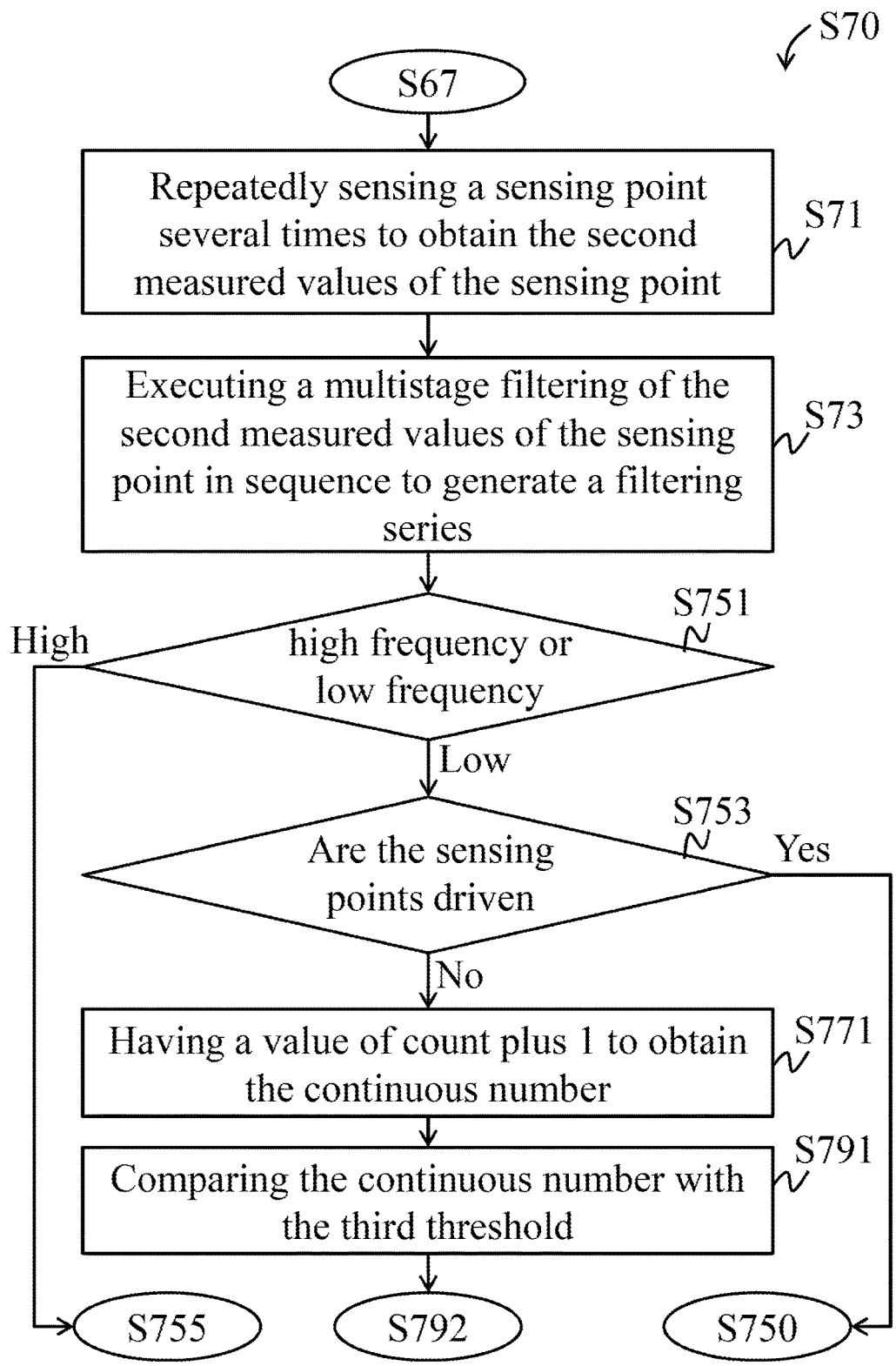
FIGS. 7-10 illustrate detailed flow charts of step S70 of FIG. 4 according to another embodiment of the instant disclosure.

Referring to FIG. 7, in step S75 according to some embodiments, the sensing controller 12 determines whether the signal characteristic of each of the second measured values is high frequency or low frequency one by one (step S751). When the sensing controller 12 determines that the signal characteristics of the second measured values are low frequency, the sensing controller 12 confirms whether the sensing points P(1, 1)–P(n, m) are driven or not (step S753).

Referring to FIG. 7, in step S77 according to some embodiments, When the sensing controller 12 determines that the signal characteristics of the second measured values are low frequency and confirms that the sensing points P(1, 1)–P(n, m) are not driven, the sensing controller 12 controls a counter (hereinafter called the first counter) to have a value of count plus 1 to obtain the continuous number (i.e., the value of count of the first counter) (step S771).

Figure 8:
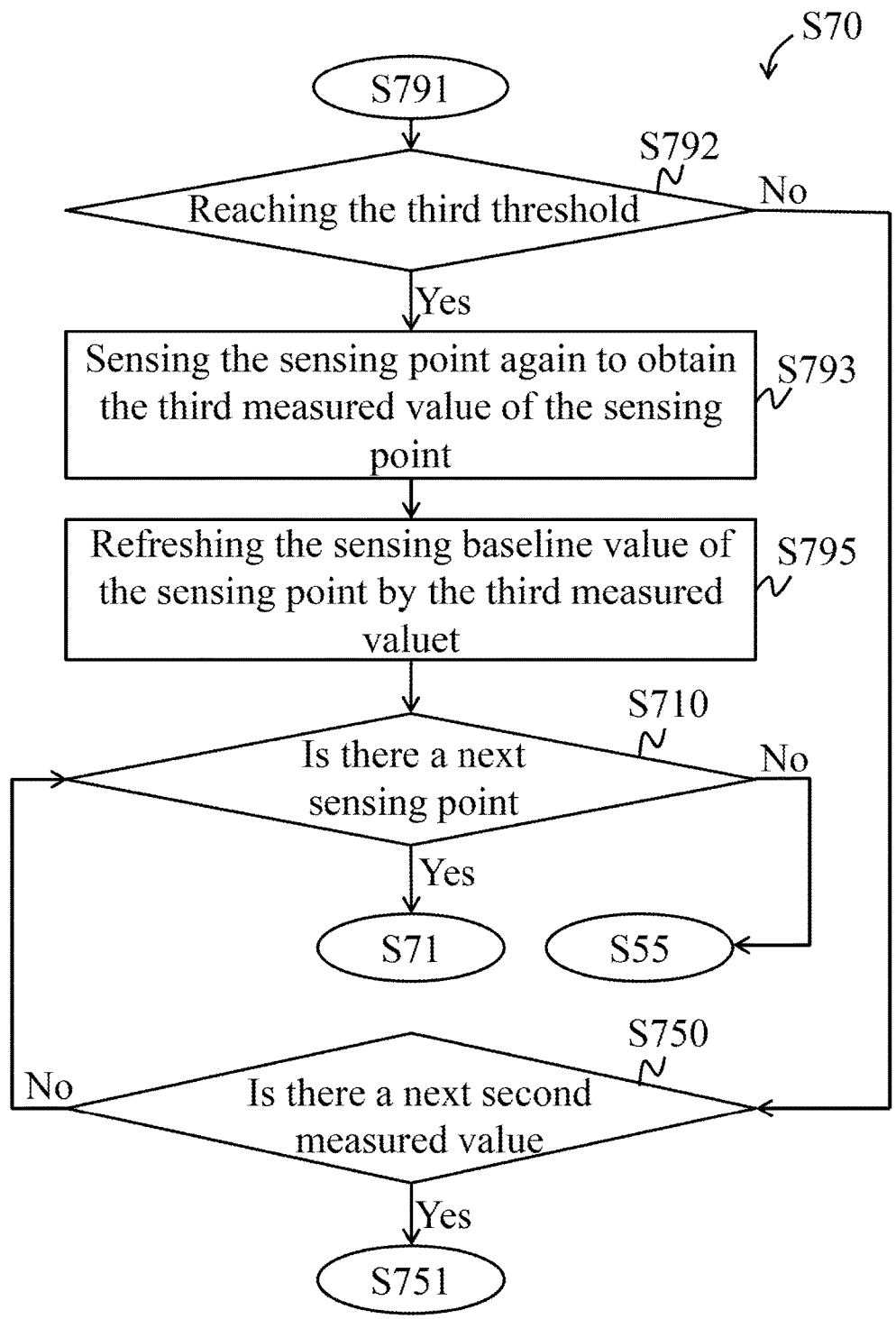

Referring to FIG. 7 and FIG. 8, in step S83 according to some embodiments, after counting the continuous number (step S771), the sensing controller 12 compares the continuous number with the third threshold (step S791) to confirm whether the continuous number reaches the third threshold (step S792). When the continuous number reaches the third threshold, the sensing controller 12 senses the sensing point P(1, 1) again to obtain the third measured value of the sensing point P(1, 1) (step S793). Then the sensing controller 12 refreshes (updates) the sensing baseline value of the sensing point P(1, 1) by the obtained third measured value (the third measured value obtained in step S793) of the sensing point P(1, 1) (step S795). After refreshing, the sensing controller 12 confirms whether the sensing point P(1, 1) is the last sensing point or not, i.e., whether there is a next sensing point not being processed by the correcting procedure or not (step S710). When there is a next sensing point not being processed by the correcting procedure, the sensing controller 12 executes the correcting procedure of the next sensing point (the sensing point P(2, 1) in the example) (i.e., returning to step S71). When there is not any next sensing point not being processed by the correcting procedure, the sensing controller 12 executes the sensing procedure of the position information of the sensing points P(1, 1)–P(n, m) based upon current sensing baseline values (the sensing baseline values of the sensing points P(1, 1)–P(n, m) corrected and obtained in step S70) (step S55). When the continuous number does not reach the third threshold, the sensing controller 12 confirms whether there is a next second measured value of the sensing point P(1, 1) of which the signal characteristic needs to be determined (step S750). When there is a next second measured value, the sensing controller 12 continues to determine whether the next second measured value is high frequency or low frequency (i.e., returning to step S751). When there is not any next second measured value, the sensing controller 12 confirms whether the sensing point P(1, 1) is the last sensing point or not, i.e., whether there is a next sensing point not being processed by the correcting procedure or not (step S710).

When the sensing controller 12 determines that the signal characteristics of the second measured values are low frequency and confirms that the sensing points P(1, 1)–P(n, m) are driven, the sensing controller 12 confirms whether there is a next second measured value of the sensing point P(1, 1) of which the signal characteristic needs to be determined (step S750). When there is a next second measured value, the sensing controller 12 continues to determine whether the next second measured value is high frequency or low frequency (i.e., returning to step S751). When there is not any next second measured value, the sensing controller 12 confirms whether the sensing point P(1, 1) is the last sensing point or not, i.e., whether there is a next sensing point not being processed by the correcting procedure or not (step S710). When there is a next sensing point not being processed by the correcting procedure, the sensing controller 12 executes the correcting procedure of the next sensing point (the sensing point P(2, 1) in the example) (i.e., returning to step S71). When there is not any next sensing point not being processed by the correcting procedure, the sensing controller 12 executes the sensing procedure of the position information of the sensing points P(1, 1)–P(n, m) based upon current sensing baseline values (the sensing baseline values of the sensing points P(1, 1)–P(n, m) corrected and obtained in step S70) (step S55).

Figure 9:
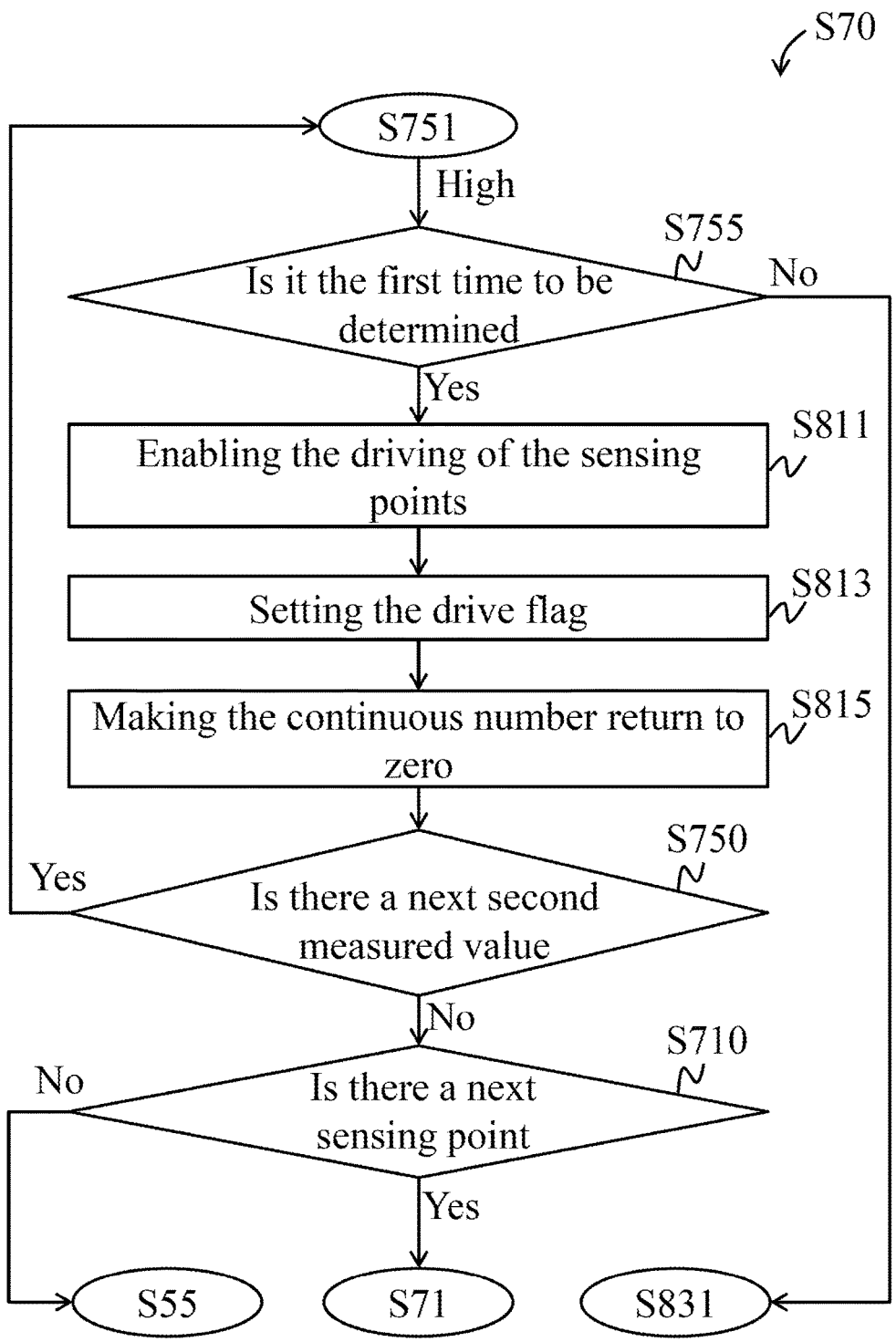

Referring to FIG. 7 and FIG. 9, when the sensing controller 12 determines that the signal characteristics of the second measured values are high frequency, the sensing controller 12 confirms whether there is a drive flag, to confirm whether the second measured values of the sensing point P(1, 1) are the first time to be determined to be high frequency (step S755).

Referring to FIG. 9, in step S81 according to some embodiments, when there is not any drive flag (meaning that it's the first time of being determined to be high frequency), the sensing controller 12 enables the driving of the sensing points P(1, 1)–P(n, m) (step S811) and sets the drive flag (step S813). In addition to driving the sensing points P(1, 1)–P(n, m) (step S811), the sensing controller 12 makes the first counter return to zero, i.e., the counted continuous number returns to zero (step S815). Then the sensing controller 12 confirms whether there is a next second measured value of the sensing point P(1, 1) of which the signal characteristic needs to be determined (step S750). When there is a next second measured value, the sensing controller 12 continues to determine whether the next second measured value is high frequency or low frequency (i.e., returning to step S751). When there is not any next second measured value, the sensing controller 12 confirms whether the sensing point P(1, 1) is the last sensing point or not, i.e., whether there is a next sensing point not being processed by the correcting procedure or not (step S710). When there is a next sensing point not being processed by the correcting procedure, the sensing controller 12 executes the correcting procedure of the next sensing point (the sensing point P(2, 1) in the example) (i.e., returning to step S71). When there is not any next sensing point not being processed by the correcting procedure, the sensing controller 12 executes the sensing procedure of the position information of the sensing points P(1, 1)–P(n, m) based upon current sensing baseline values (the sensing baseline values of the sensing points P(1, 1)–P(n, m) corrected and obtained in step S70) (step S55).

Figure 10:
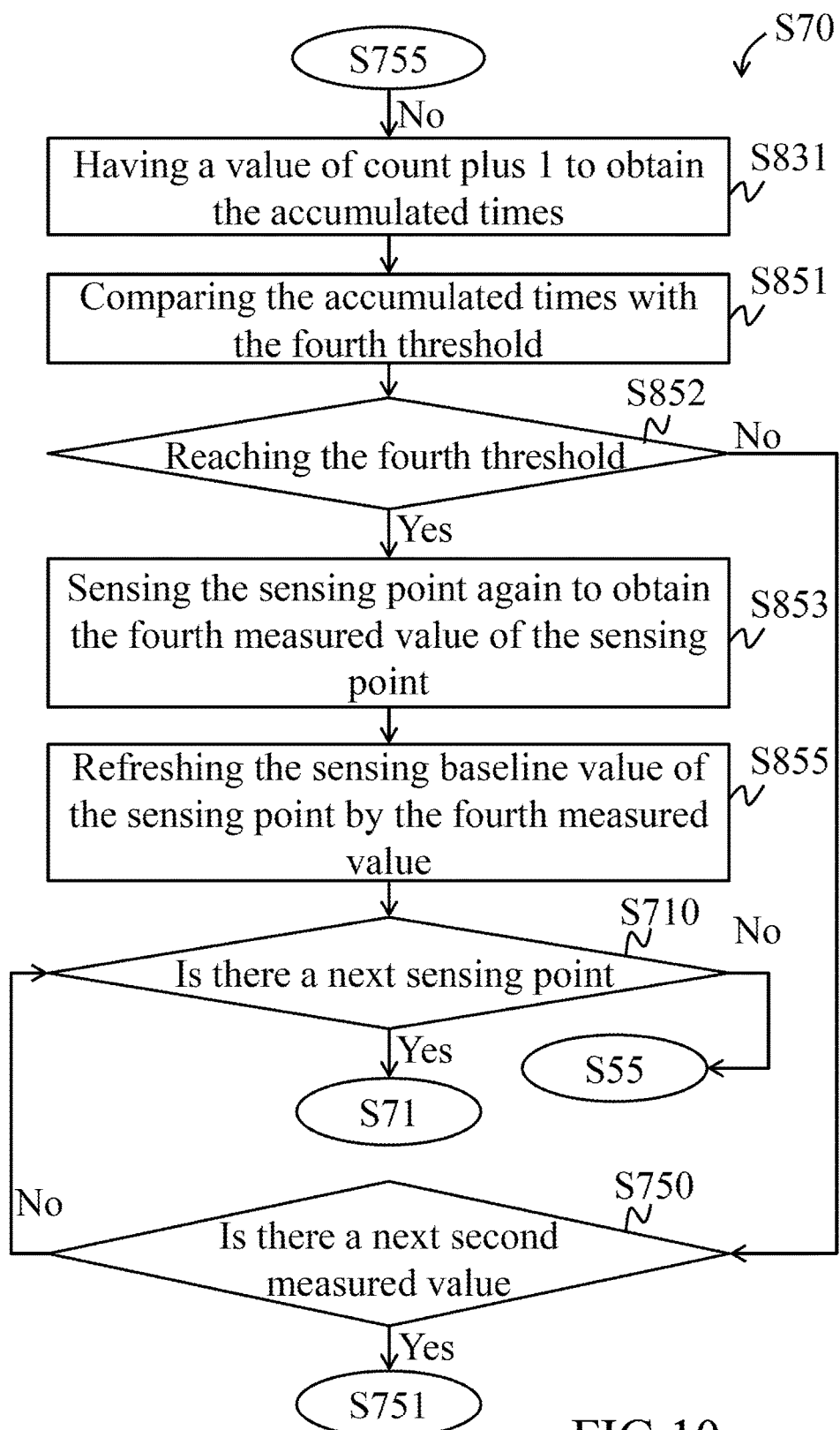

Referring to FIG. 9 and FIG. 10, in step S83 according to some embodiments, when there is not any drive flag (meaning that it's the first time of being determined to be high frequency), the sensing controller 12 controls another counter (hereinafter called the second counter) to have a value of count plus 1 to obtain the accumulated times (i.e., the value of count of the second counter) (step S831).

Referring to FIG. 10, in step S85 according to some embodiments, after counting the accumulated times (step S831), the sensing controller compares the accumulated times with the fourth threshold (step S851) to confirm whether the accumulated times reaches the fourth threshold (step S852). When the accumulated times reaches the fourth threshold, the sensing controller 12 senses the sensing point P(1, 1) again to obtain the fourth measured value of the sensing point P(1, 1) (step S853). Then the sensing controller 12 refreshes (updates) the sensing baseline value of the sensing point P(1, 1) by the obtained fourth measured value (the fourth measured value obtained in step S853) of the sensing point P(1, 1) (step S855). After refreshing, the sensing controller 12 confirms whether the sensing point P(1, 1) is the last sensing point or not, i.e., whether there is a next sensing point not being processed by the correcting procedure or not (step S710). When there is a next sensing point not being processed by the correcting procedure, the sensing controller 12 executes the correcting procedure of the next sensing point (the sensing point P(2, 1) in the example) (i.e., returning to step S71). When there is not any next sensing point not being processed by the correcting procedure, the sensing controller 12 executes the sensing procedure of the position information of the sensing points P(1, 1)–P(n, m) based upon current sensing baseline values (the sensing baseline values of the sensing points P(1, 1)–P(n, m) corrected and obtained in step S70) (step S55). When the accumulated times does not reach the fourth threshold, the sensing controller 12 confirms whether there is a next second measured value of the sensing point P(1, 1) of which the signal characteristic needs to be determined (step S750). When there is a next second measured value, the sensing controller 12 continues to determine whether the next second measured value is high frequency or low frequency (i.e., returning to step S751). When there is not any next second measured value, the sensing controller 12 confirms whether the sensing point P(1, 1) is the last sensing point or not, i.e., whether there is a next sensing point not being processed by the correcting procedure or not (step S710).

In some embodiments, the sensing controller 12 can scan all of the sensing points P(1, 1)–P(n, m) at one time and can repeatedly scan several times to obtain the second measured values of all of the sensing points P(1, 1)–P(n, m). The sensing controller 12 executes the multistage filtering of the second measured values of each of the sensing points one by one and then executes the determining of the signal characteristics.

It shall be understood that a sequence for executing the described steps is not limited to the aforementioned sequence and can be various according to different situation.

Figure 11:
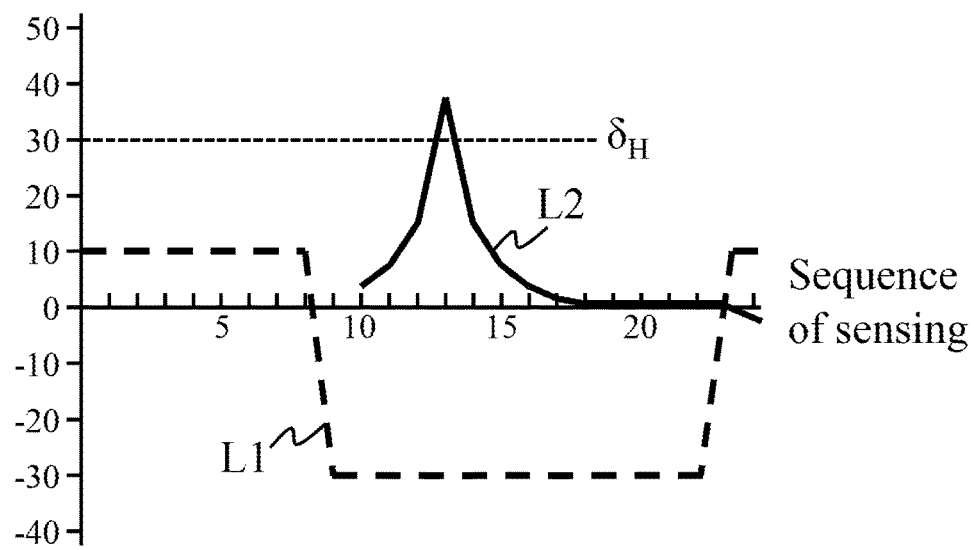
FIG. 11 illustrates a diagram of the correlation of a second measured value and a filtering series according to an embodiment of the instant disclosure.

In some embodiments, the variation threshold comprises an upper threshold $\delta_H$. Below is an example that the touching element is water. Referring to FIG. 11, L1 is the second measured values of the sensing point, and L2 is the filtering series of the sensing point. In the example, the upper threshold $\delta_H$ can be set to 30; therefore, the signal characteristics of the second measured values obtained at the $1^{st}$ to $12^{th}$ times and the $14^{th}$ to $24^{th}$ times of sensing are determined to be low frequency, and the signal characteristic of the second measured value obtained at the $13^{th}$ time of sensing is determined to be high frequency. Meanwhile, after the signal characteristic of the second measured value obtained at the $12^{th}$ time of sensing is determined, the continuous number is 12. After determining the signal characteristic of the second measured value obtained at the $13^{th}$ time of sensing, the sensing controller 12 drives the sensing points P(1, 1)–P(n, m).

Figure 12:
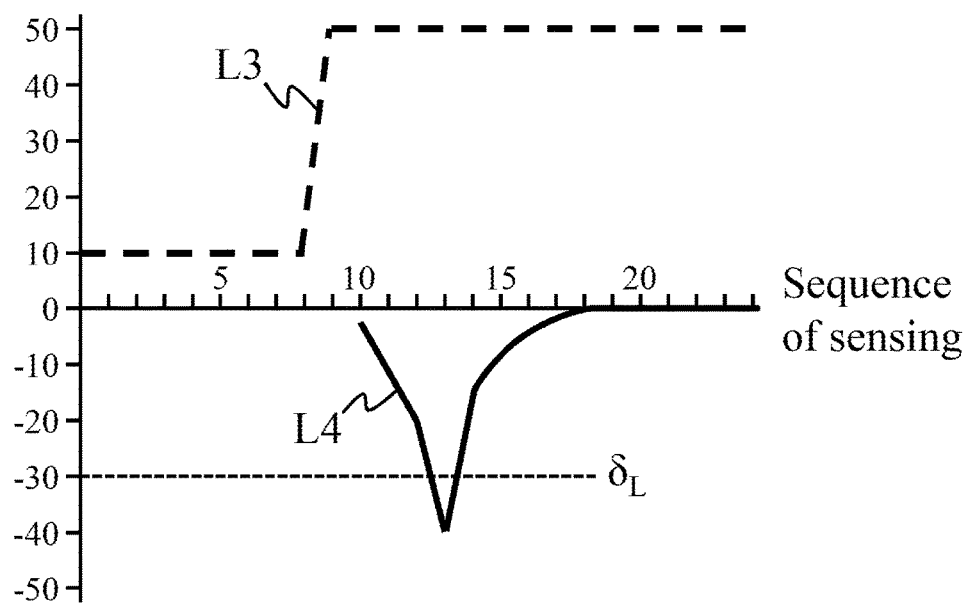
FIG. 12 illustrates a diagram of the correlation of a second measured value and a filtering series according to another embodiment of the instant disclosure.

In some embodiments, the variation threshold comprises a lower threshold $\delta_L$. Below is an example that the touching element is a hand which contacts the signal sensor 14 for a long time without removing from the signal sensor 14. Referring to FIG. 12, L3 is the second measured values of the sensing point, and L4 is the filtering series of the sensing point. In the example, the lower threshold $\delta_L$ can be set to −30; therefore, the signal characteristics of the second measured values obtained at the $1^{st}$ to $12^{th}$ times and the $14^{th}$ to $24^{th}$ times of sensing are determined to be low frequency, and the signal characteristic of the second measured value obtained at the $13^{th}$ time of sensing is determined to be high frequency. Meanwhile, after the signal characteristic of the second measured value obtained at the $12^{th}$ time of sensing is determined, the continuous number is 12. After determining the signal characteristic of the second measured value obtained at the $13^{th}$ time of sensing, the sensing controller 12 drives the sensing points P(1, 1)–P(n, m).

Figure 13:
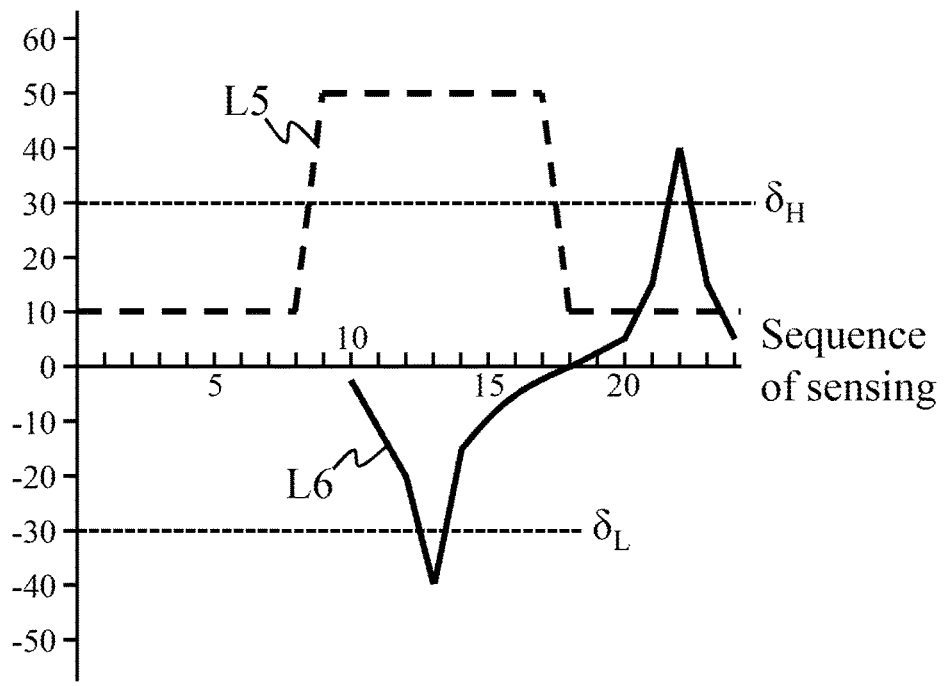
FIG. 13 illustrates a diagram of the correlation of a second measured value and a filtering series according to yet another embodiment of the instant disclosure.

In some embodiments, the variation threshold comprises an upper threshold $\delta_H$ and a lower threshold $\delta_L$. Below is an example that the touching element is a hand. Referring to FIG. 13, L5 is the second measured values of the sensing point, and L6 is the filtering series of the sensing point. In the example, the upper threshold $\delta_H$ can be set to 30, and the lower threshold $\delta_L$ can be set to −30; therefore, the signal characteristics of the second measured values obtained at the $1^{st}$ to $12^{th}$ times, the $14^{th}$ to $21^{th}$ times, the $23^{th}$ time, and the $24^{th}$ time of sensing are determined to be low frequency, and the signal characteristic of the second measured value obtained at the $13^{th}$ time and the $22^{th}$ time of sensing are determined to be high frequency. Meanwhile, after the signal characteristic of the second measured value obtained at the $12^{th}$ time of sensing is determined, the continuous number is 12. After determining the signal characteristic of the second measured value obtained at the $13^{th}$ time of sensing, the sensing controller 12 drives the sensing points P(1, 1)–P(n, m). After the signal characteristic of the second measured value obtained at the $24^{th}$ time of sensing is determined, the number of the accumulated times is 1. Although the value of the upper threshold is opposite to that of the lower threshold in the example, the value of the upper threshold is not necessarily opposite to that of the lower threshold in another example.

Figure 14:
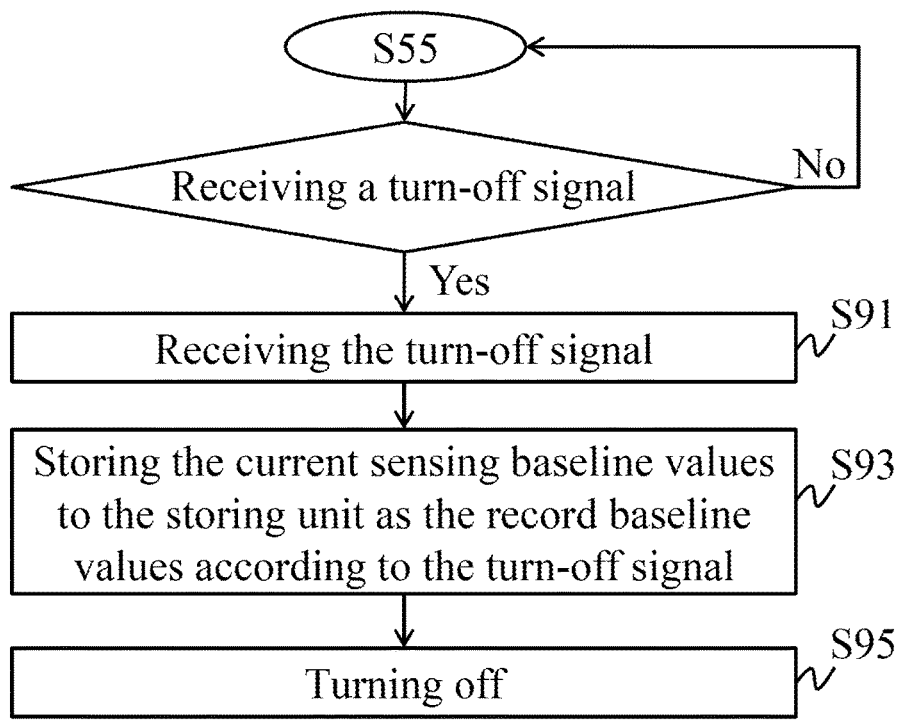
FIG. 14 illustrates a partial flow chart of a refreshing method of sensing baseline values for a capacitive sensor device according to another embodiment of the instant disclosure.

In the aforementioned embodiments, the record baseline value is the sensing baseline value used previously when the signal sensor 14 is turned off. In some embodiments, referring to FIG. 14, when the sensing controller 12 receives a turn-off signal (step S91), the sensing controller 12, according to the turn-off signal, stores current sensing baseline values of the sensing points P(1, 1)–P(n, m) to the storing unit 16 as the record baseline values of the sensing points P(1, 1)–P(n, m) (step S93) and then turns off (step S95).

In the aforementioned embodiments, the sensing controller 12 executes the refreshing procedure of the sensing baseline values of the sensing points P(1, 1)–P(n, m) when the electronic device is turned on; however, the instant disclosure is not limited to the aforementioned embodiments. In some embodiments, in addition to executing when the electronic device is turned on, the sensing controller 12 executes the refreshing procedure of the sensing baseline values at a time interval during the process of executing the sensing procedure of the position information of the sensing points P(1, 1)–P(n, m). Depending on the needs, each of the time intervals can be the same or can be different.

In the aforementioned embodiments, the differences between two values are approximately equal, meaning that the differences between two corresponding values are isometric.

In the aforementioned embodiments, the position information can be, but not limited to, coordinates of touching. The coordinates of touching can be, but not limited to, relative coordinates, absolute coordinates, or any other information capable of representing input (touch) positions. Moreover, the position information is obtained by the processing unit 30 when the touching element touches the signal sensor 14.

In some embodiments, the processing unit 30 and the capacitive sensor device can be arranged in the same housing. Or the processing unit 30 (e.g., the processor inside a computer) and the capacitive sensor device can be arranged in different housings.

In some embodiments, the electronic device can be, but not limited to, a smart phone, a portable navigation device (PND), a digital photo frame (DPF), an e-book reader, a laptop, a tablet (pad), a touch panel, an electronic drawing board, or an electronic hand writing board.

If the electronic device is a touch panel or a device with a touch panel, a touch event can be triggered by the touching element such as a finger or a stylus. If the electronic device is an electronic drawing board, a touch event can be triggered by the touching element corresponding to the electronic drawing board such as a touch brush. If the electronic device is an electronic hand writing board, a touch event can be triggered by the touching element corresponding to the electronic hand writing board such as a touch pen or a finger.

In some embodiments, the refreshing method of the sensing baseline values of the capacitive sensor device according to an embodiment of the instant disclosure can be practiced by a computer program product. When a computer (i.e., the aforementioned electronic device) loads and executes programs, the computer can perform the refreshing method of the sensing baseline values of the capacitive sensor device according to any embodiments of the instant disclosure. In some embodiments, the computer program product can be a readable recording medium. The above programs are stored in the readable recording medium for computer to load. In some embodiments, the above programs can be a computer program product itself and can be transmitted to the computer in a wire or a wireless manner.

Concisely, according to the embodiments of the instant disclosure, whether to use the current measured values (the first measured values) as the sensing baseline values for be used in the following sensing procedure can be determined by confirming whether the differences between the first measured values and the factory baseline values are approximately equal or whether the differences between the first measured values and the record baseline values are approximately equal. When the differences are approximately equal, the current measured values are used as the sensing baseline values. When the differences are not approximately equal, the factory baseline values are used as the sensing baseline values to execute the correcting procedure of the sensing baseline values of each of the sensing points. In the correcting procedure, whether to refresh the corresponding sensing baseline values by the current measured values (the third or the fourth measured values) and the timing to refresh can be determined by confirming whether the signal characteristics of the measured values (the second measured values) of each of the sensing points are high frequency or low frequency. In other words, if the rate of change of measured signals (the second measured values) is high, the refreshing the sensing baseline values can be delayed; if the rate of change of measured signals (the second measured values) is low, the refreshing is executed when the changes of measured signals is over the value of progressive change of refreshing (the third threshold).

Therefore, according to the embodiments of the refreshing method of sensing baseline values for a capacitive sensor device and the capacitive sensor device, the misjudgment occurring due to the touching element touching the sensor device for a long time can be avoided, and the error of measured values caused by immediate determination of the sensing baseline values when the touch event occurs or ends can also be avoided. Therefore, the sensing baseline values to a usable state are rapidly transferred, the times of refreshing the sensing baseline values can be decreased, and resources can be saved.

What is claimed is:

1. A refreshing method of sensing baseline values for a capacitive sensor device, comprising: reading a plurality of factory baseline values of a plurality of sensing points;
reading a plurality of record baseline values of the sensing points;
sensing the sensing points to obtain a plurality of first measured values of the sensing points;
calculating a plurality of first differences between the first measured values and the corresponding factory baseline values of the sensing points; calculating a first variance of the plurality of first differences;
comparing the first variance with a first threshold;
when the first variance is less than the first threshold, using the first measured values as the sensing baseline values of the sensing points and executing a sensing procedure of the position information of the sensing points based upon the sensing baseline values;
calculating a plurality of second differences between the first measured values and the corresponding record baseline values of the sensing points;
calculating a second variance of the second differences;
comparing the second variance with a second threshold;
when the second variance is less than the second threshold, using the first measured values as the sensing baseline values of the sensing points and executing the sensing procedure based upon the sensing baseline values;
when the first variance is not less than the first threshold and the second variance is not less than the second threshold, using the factory baseline values as the sensing baseline values of the sensing points, disabling the driving of the sensing points, and executing a correcting procedure of each of the sensing points,
wherein the correcting procedure of each of the sensing points comprises:
sensing the sensing point two or more times repeatedly to obtain a plurality of second measured values of the sensing point;
executing a multistage filtering of the second measured values in sequence to generate a filtering series;
determining whether the signal characteristic of each of the second measured values is high frequency or low frequency in sequence based upon the filtering series and a variation threshold;
counting a number of continuous occurrences that the signal characteristics of the second measured values are determined to be low frequency when the driving of the sensing points is disabled;
upon the first occurrence when the signal characteristics of the second measured values are determined to be high frequency, enabling the driving of plural sensing points of all of the sensing points;
counting an accumulation of occurrences that the rest of the signal characteristics of the second measured values are determined to be high frequency when the driving of the sensing points is enabled;
when the number of continuous occurrences reaches a third threshold, sensing the sensing point to obtain a third measured value of the sensing point and refreshing the sensing baseline value of the sensing point by the third measured value; and
when the accumulation of occurrences reaches a fourth threshold, sensing the sensing point to obtain a fourth measured value of the sensing point and refreshing the sensing baseline value of the sensing point by the fourth measured value; and
after the correcting procedures of all of the sensing points are complete, executing the sensing procedure based upon the sensing baseline values.

2. The refreshing method of sensing baseline values for a capacitive sensor device of claim 1, further comprises: receiving a turn-off signal; and storing current sensing baseline values as the record baseline values according to the turn-off signal.

3. The refreshing method of sensing baseline values for a capacitive sensor device of claim 1, wherein the variation threshold comprises an upper threshold, and the determining of the signal characteristic of each of the second measured values comprises: when a filtering value corresponding to the second measured value in the filtering series is less than the upper threshold, determining that the signal characteristic of the second measured value is low frequency; and when a filtering value corresponding to the second measured value in the filtering series is not less than the upper threshold, determining that the signal characteristic of the second measured value is high frequency.

4. The refreshing method of sensing baseline values for a capacitive sensor device of claim 1, wherein the variation threshold comprises a lower threshold, and the determining of the signal characteristic of each of the second measured values comprises: when a filtering value corresponding to the second measured value in the filtering series is greater than the lower threshold, determining that the signal characteristic of the second measured value is low frequency; and when a filtering value corresponding to the second measured value in the filtering series is not greater than the lower threshold, determining that the signal characteristic of the second measured value is high frequency.

5. The refreshing method of sensing baseline values for a capacitive sensor device of claim 1, wherein the variation threshold comprises an upper threshold and a lower threshold, and the determining of the signal characteristic of each of the second measured values comprises: when a filtering value corresponding to the second measured value in the filtering series is less than the upper threshold and is greater than the lower threshold, determining that the signal characteristic of the second measured value is low frequency; when a filtering value corresponding to the second measured value in the filtering series is not less than the upper threshold, determining that the signal characteristic of the second measured value is high frequency; and when a filtering value corresponding to the second measured value in the filtering series is not greater than the lower threshold, determining that the signal characteristic of the second measured value is high frequency.

6. The refreshing method of sensing baseline values for a capacitive sensor device of claim 1, wherein the multistage filtering is a high pass filtering.

7. The refreshing method of sensing baseline values for a capacitive sensor device of claim 1, wherein the multistage filtering is a low pass filtering.

8. A capacitive sensor device, comprising:
a plurality of first electrode lines;
a plurality of second electrode lines, wherein the first electrode lines and the second electrode lines are arranged in a staggered manner and define a plurality of sensing points arranged in a matrix;
a storing unit for storing a plurality of factory baseline values and a plurality of record baseline values of the sensing points; and
a sensing controller electrically connected to the first electrode lines, the second electrode lines, and the storing unit,
wherein the sensing controller is for executing a refreshing procedure, and the refreshing procedure comprises:
reading the factory baseline values from the storing unit;
reading the record baseline values from the storing unit;
sensing the sensing points to obtain a plurality of first measured values of the sensing points;
calculating a plurality of first differences between the first measured values and the corresponding factory baseline values of the sensing points;
calculating a first variance of the first differences; comparing the first variance with a first threshold;
when the first variance is less than the first threshold, using the first measured values as the sensing baseline values of the sensing points and executing a sensing procedure of the position information of the sensing points based upon the sensing baseline values;
calculating a plurality of second differences between the first measured values and the corresponding record baseline values of the sensing points;
calculating a second variance of the second differences; comparing the second variance with a second threshold;
when the second variance is less than the second threshold, using the first measured values as the sensing baseline values of the sensing points and executing the sensing procedure based upon the sensing baseline values;
when the first variance is not less than the first threshold and the second variance is not less than the second threshold, using the factory baseline values as the sensing baseline values of the sensing points, disabling the driving of the sensing points, and executing a correcting procedure of each of the sensing points,
wherein the correcting procedure of each of the sensing points comprises:
sensing the sensing point two or more times repeatedly to obtain a plurality of second measured values of the sensing point;
executing a multistage filtering of the second measured values in sequence to generate a filtering series;
determining whether the signal characteristic of each of the second measured values is high frequency or low frequency in sequence based upon the filtering series and a variation threshold;
counting a number of continuous occurrences that the signal characteristics of the second measured values are continuously determined to be low frequency when the driving of the sensing points is disabled;
upon the first occurrence when the signal characteristics of the second measured values are determined to be high frequency, enabling the driving of plural sensing points of all of the sensing points;
counting an accumulation of occurrences that the rest of the signal characteristics of the second measured values are determined to be high frequency when the driving of the sensing points is enabled;
when the number of continuous occurrences reaches a third threshold, sensing the sensing point to obtain a third measured value of the sensing point and refreshing the sensing baseline value of the sensing point by the third measured value; and
when the accumulation of occurrences reaches a fourth threshold, sensing the sensing point to obtain a fourth measured value of the sensing point and refreshing the sensing baseline value of the sensing point by the fourth measured value; and
after the correcting procedures of all of the sensing points are complete, executing the sensing procedure based upon the sensing baseline values.

9. The capacitive sensor device of claim 8, wherein the sensing controller further executes:
receiving a turn-off signal; and storing current sensing baseline values to the storing unit as the record baseline values according to the turn-off signal.

10. The capacitive sensor device of claim 8, wherein the variation threshold comprises an upper threshold, and the determining of the signal characteristic of each of the second measured values executed by the sensing controller comprises: when a filtering value corresponding to the second measured value in the filtering series is less than the upper threshold, determining that the signal characteristic of the second measured value is low frequency; and when a filtering value corresponding to the second measured value in the filtering series is not less than the upper threshold, determining that the signal characteristic of the second measured value is high frequency.

11. The capacitive sensor device of claim 8, wherein the variation threshold comprises a lower threshold, and the determining of the signal characteristic of each of the second measured values executed by the sensing controller comprises: when a filtering value corresponding to the second measured value in the filtering series is greater than the lower threshold, determining that the signal characteristic of the second measured value is low frequency; and when a filtering value corresponding to the second measured value in the filtering series is not greater than the lower threshold, determining that the signal characteristic of the second measured value is high frequency.

12. The capacitive sensor device of claim 8, wherein the variation threshold comprises an upper threshold and a lower threshold, and the determining of the signal characteristic of each of the second measured values executed by the sensing controller comprises: when a filtering value corresponding to the second measured value in the filtering series is less than the upper threshold and is greater than the lower threshold, determining that the signal characteristic of the second measured value is low frequency; when a filtering value corresponding to the second measured value in the filtering series is not less than the upper threshold, determining that the signal characteristic of the second measured value is high frequency; and when a filtering value corresponding to the second measured value in the filtering series is not greater than the lower threshold, determining that the signal characteristic of the second measured value is high frequency.

13. The capacitive sensor device of claim 8, wherein the multistage filtering is a high pass filtering.

14. The capacitive sensor device of claim 8, wherein the multistage filtering is a low pass filtering.

* * * * *